March 23, 1943. R. M. HORTVET 2,314,827
PROCESS FOR EXTRACTING PURE NITROGEN FROM AIR
Original Filed Feb. 27, 1939 5 Sheets-Sheet 1

Inventor:
Richard M. Hortvet.
By Attorney

March 23, 1943.  R. M. HORTVET  2,314,827
PROCESS FOR EXTRACTING PURE NITROGEN FROM AIR
Original Filed Feb. 27, 1939  5 Sheets-Sheet 5

Inventor:
Richard M. Hortvet.
By H. A. Whiteley
Attorney.

Patented Mar. 23, 1943

2,314,827

UNITED STATES PATENT OFFICE 2,314,827

PROCESS FOR EXTRACTING PURE NITROGEN FROM AIR

Richard M. Hortvet, Minneapolis, Minn., assignor to Diamond Iron Works, Incorporated, Minneapolis, Minn.

Original application February 27, 1939, Serial No. 258,658. Divided and this application February 5, 1940, Serial No. 317,312

2 Claims. (Cl. 23—220)

My invention relates to a process for extracting pure nitrogen from air, and has for its object to take atmospheric air and pass it through a series of treatments whereby oxygen, carbon dioxide and water vapor will be removed and the residue of nitrogen will be obtained in a substantially pure condition.

Air, as is well known, is a mixture of gases, properly of the inert gas nitrogen and oxygen with small amounts of carbon dioxide and water vapor and practically negligible quantities of certain other gases. Substantially pure nitrogen has valuable uses in industrial technical processes, but heretofore the processes for obtaining substantially pure nitrogen have been practically too costly. It is therefore, a principal object of my invention to provide a process for obtaining from the air substantially pure nitrogen at a cost low enough to make its use commercially practical in those industrial technical processes.

In carrying out this object in the practice of my process I subject a regulated current of air to a regulated current of fuel gas in combination with said air so as to obtain complete combustion of all oxygen and fuel thus brought together. The result of this complete combustion will be a mixture of nitrogen, water vapor and carbon dioxide, and I treat this gas mixture so as first to remove heat therefrom then to separate the carbon dioxide from the nitrogen and water vapor and finally to separate the water vapor from the nitrogen and recover the nitrogen in substantially pure form.

It is a further object of my invention in the practice of my process to subject the mixture of gases, nitrogen, carbon dioxide and water vapor, to regulated contact with a substance capable of withdrawing the carbon dioxide from said mixture, and of carrying out this step of my process in such manner that all carbon dioxide will be withdrawn.

It is a further object of my invention to employ a liquid agent such as monoethanolamine in a properly concentrated solution and continuously to pass the gases of combustion under pressure through said solution in the form of vast numbers of very minute bubbles, and of circulating the solution continuously and removing the carbon dioxide content thereof as the liquid is circulated.

It is a further object of my invention to pass the mixture of gases, after the carbon dioxide has been removed, in intimate contact with substances such as silica gel or alumina by which water vapor will be removed therefrom and thereafter to recover and store for use, resulting substantially pure nitrogen.

It is a further object of my invention to maintain the processes continuously by reactivating part of the dehydrating material at the same time that another part is employed in dehydrating and by shifting the flow of gases from one body of dehydrating material to the other so that the process may be carried on continuously.

It is a further object of my invention to employ the heat withdrawn from the hot furnace gases for aiding in heating the liquid carbon dioxide adsorber to drive off carbon dioxide. The essential purpose of my process is to operate upon air so as to reduce all oxygen in the air to carbon dioxide to separate from the resulting mixture of nitrogen, carbon dioxide and water vapor, all of the carbon dioxide and water vapor in said mixture and to carry on the steps of the process continuously whereby air treated at the beginning will be reduced to pure nitrogen discharged at the end of the process of its operations.

The full objects and advantages of my invention appear in connection with the detailed description thereof and its novel features by which the advantageous results of my process are obtained will be particularly pointed out in the claims.

A form of apparatus for carrying out the various steps of my process is illustrated in the drawings, and is claimed in my application Serial Number 258,658, filed February 27, 1939, of which this is a division, but it is not to be understood that the practice of the process is limited to the form of the invention disclosed in the accompanying drawings. In these drawings—

In the practice of my process it will be apparent that the first step must consist in complete reduction of oxygen in the air. But this step must be carried out without contaminating the resulting mixture with fuel gas. The fuel will be preferably in the form of gas, and the mixture of this gas with the incoming air must be so proportionate in relation to the form of combustion that complete chemical union takes place between all of the fuel supplied and all of the oxygen in the gas. The resulting gas mixture, which is terrifically hot, has to be cooled after which the cooled gas is passed through or about some substance to remove the carbon dioxide from the gas. I have found the liquid known as monoethanolamine to be highly satisfactory for the purpose. A third step in the treatment of the gas consists in taking it from the scrubber where it has been subjected to the carbon dioxide removing chemical, into intimate contact with some water adsorbing substance such as silica gel or alumina, of which I have found alumina to be very satisfactory, and which will remove the water from the gas mixture leaving substantially pure nitrogen which may be passed to any desired means of storing it or compressing it in tanks for future use.

The monoethanolamine or other substance used for removing carbon dioxide to make the process effective and economical must be continually reactivated. That is, the carbon dioxide taken up therein must be driven off. This is effected by passing the monoethanolamine through instrumentalities which include a boiler, since boiling the liquid will drive off the carbon dioxide and the liquid monoethanolamine must afterwards be cooled before being returned to the scrubber. A second supplemental feature of the process requires that a continuously-operative dehydrating tower be available at all times, which necessitates reactivating the dehydrating material, whether it be alumina, silica gel or the like, and means has been provided for having two towers, in one of which the dehydrating material is being reactivated while the other is being used as a dehydrator, together with means for delivering hot air to the tower where reactivation is taking place and delivering cooled air, to take away the heat released in dehydration, to the dehydrating tower used to take the water vapor from the nitrogen gas.

These several sets of instrumentalities embodying the several steps of my process will be taken up in order.

*Generating the combustion gas mixture*

Figures 17, 18, 19:
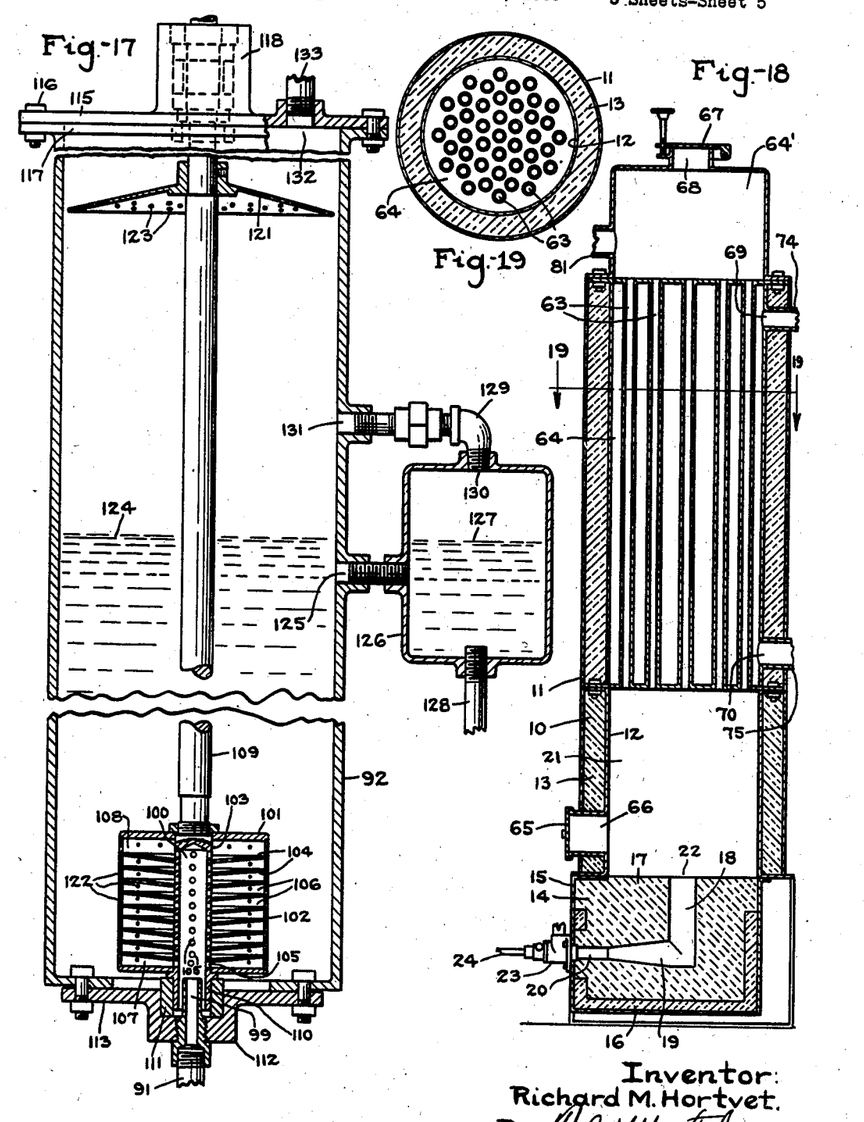
Fig. 17 is a sectional elevation view taken through the body of the carbon dioxide removing or scrubber tank.
Fig. 18 is a sectional elevation view taken through the main body of the burner and combustion chamber including the cooling and air-heating means.
Fig. 19 is a sectional view taken on line 19—19 of Fig. 18.

A cylinder 10 stands vertically and as shown in Fig. 18 is provided with inner and outer shells 11 and 12 with heavy insulation 13 between these walls. At the bottom of this cylinder is a combustion block 14, shown in detail in Fig. 18, which comprises an outer metallic shell 15, refractory insulation 16 and a refractory combustion block 17 having therein a vertical passage 18 which communicates through an expanding passage 19 with the burner throat 20. It will be understood that when the gas is being burned the block 17 becomes exceedingly hot, so that the mixture of gas and air is burned in a passageway 19, 18, the walls of which are heated to a very high temperature, and this is essential to secure the one hundred per cent union of oxygen and gas fuel to produce, with the nitrogen of the air and any water vapor carried by the air or generated in the combustion, a hot gas mixture which contains in addition to nitrogen and water vapor only carbon dioxide. A chamber 21 above the burner block 17 receives the hot gases from the mouth 22 of the burner passageway 18, where the hot gases expand under further great heat and final union of oxygen with the carbon of the fuel completes the reduction of fuel and oxygen of the air so as to combine all of the oxygen of the air with all of the fuel.

Figures 2, 3:
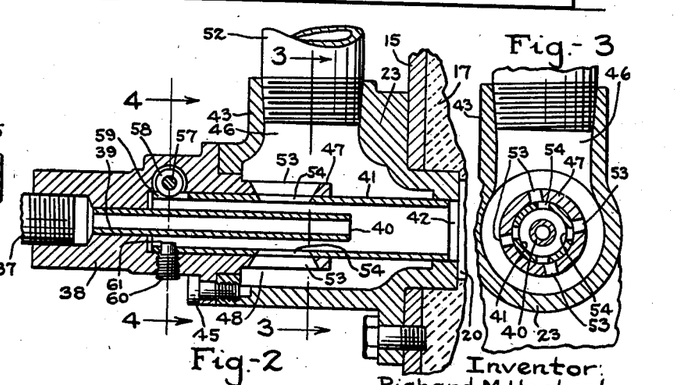
Fig. 2 is an enlarged sectional view of fuel and air mixing part of the burner mechanism.
Fig. 3 is a sectional view taken on line 3—3 of Fig. 2.
Figure 4:
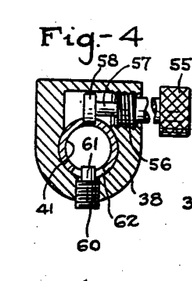
Fig. 4 is a sectional view taken on line 4—4 of Fig. 2.
Figure 14:
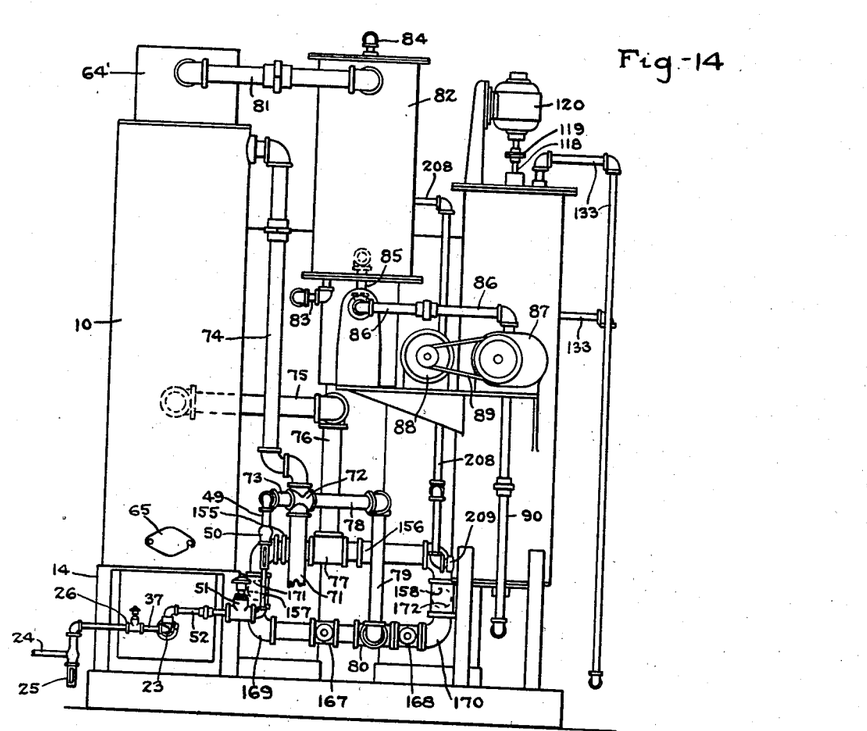
Fig. 14 is an end elevation view of the apparatus taken from the opposite end of the view shown in Fig. 7.

The burner head 23 is indicated generally in Fig. 14 and in a larger outline in Fig. 18, while its details are shown in enlarged section in Figs. 2, 3 and 4. Gas from any source of supply is delivered through pipe 24 which passes through a flow meter 25 of usual construction. Customarily gas from city mains will be employed and ordinarily during any working period the B. t. u. content of the gas will remain substantially constant. If however, conditions of variation of B. t. u. content are met with, it may be desirable to employ well known controls, not shown, for insuring a constant B. t. u. content of the fuel gas, and this I contemplate doing.

Figure 15:
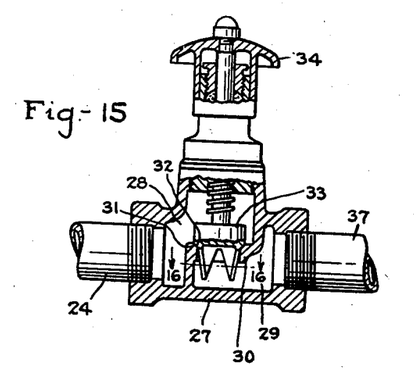
Fig. 15 is an enlarged sectional view of valve mechanism for controlling flow of fuel gas and of air.
Figure 16:
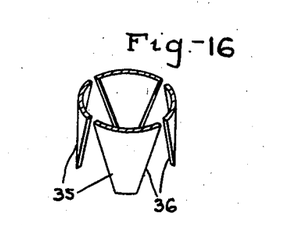
Fig. 16 is an enlarged detail view of the valve member taken substantially along line 16—16 of Fig. 15 but shown in perspective.

The gas employed for combustion before reaching the burner 23 passes through a valve structure 26, shown in enlarged detail in Figs. 15 and 16, by which the flow of gas to the burner may be very exactly adjusted. This valve comprises a body 27 having formed therein a chamber 28 which is separated from a second chamber 29 in the valve body by means of an apertured diaphragm 30. A valve seat 31 is formed about said aperture and is engaged by the valve face 32 on a valve member 33 controlled by a hand wheel 34, as clearly shown in Fig. 14. Upon the valve member 33 are integrally secured a series of wings 35, shown somewhat in detail in Fig. 16. These wings have their outer surfaces lying in the surface of a cylindrical plane and diverge along their edges from each other as indicated at 36. The result is that as the valve is lifted only small port openings at the top or point of joinder of the wings 35 will be formed, and through these openings the gas from pipe 24 and chamber 28 passes to chamber 29, and to a pipe 37, which is threaded into burner head casting 38, as clearly shown in Fig. 2. From the pipe 37 extends a smaller tube 39 within the burner head casting 38 which discharges at a point 40 within air tube 41. Tube 41 is journaled for rotative movement in burner head casting 38, which opens through port 42 into the burner throat 20.

Upon the burner head casting 38 is a second casting 43 which is secured in gas-tight relation to casting 38 by means of a setbolt 45. The casting 43 is formed with a chamber 46 which entirely surrounds a cylindrical extension 47 of casting 38 and tube 41, as clearly indicated at 48 in Fig. 2. Air under pressure from a source later to be described passes through a tube 49, flow valve 50, control valve 51 and pipe 52 into the chamber 46, 48. It is to be noted that the valve 51 is in all respects identical with the valve 26 heretofore described and operates to control the flow of air under pressure in the same manner as valve 26 controls the flow of fuel gas. Hence the air under pressure entirely surrounds extension 47 and tube 41 within chamber 46, 48. The extension 46 is provided with a series of holes 53, all centering in a circumference of extension 47, and tube 41 has holes 54 similarly disposed circumferentially so that each hole 54 is adapted to register more or less with a hole 53, as clearly shown in Fig. 3. The tube 41 is held positioned in casting 38, as shown in Figs. 2 and 4. A thumbscrew 55 is threaded into the casting 38 as indicated at 56 and carries a stem 57 having thereon a disc 58 which takes into a slot 59, best shown in Fig. 2. And a set screw 60 has a pin-like extension 61 which takes in a circumferential slot 62 in tube 41 to hold it free for rotary movement but restrained against longitudinal movements. It follows that when the thumbscrew 55 is turned it will move the disc 58 in or out, owing to the threading at 56, and this will operate to turn the tube 41 more or less, causing the holes 54 therein to register more or less with the holes 53 in extension 47, thus effecting delivery of more or less air to the annular passageway about tube 39.

It will be observed that the air is thus delivered in a cylindrical sheet about the delivery of gas from tube 39 at its outlet 40 and the gas will thus travel to the burner mixed with the air but with a greater proportion of air at the outside of the stream of combined gases. This effects more intimate contact of all of the molecules of burning gas with the molecules of the oxygen of the air, whereby the perfect and complete combustion of gas and oxygen, or the complete union of all oxygen of the air with all fluid fuel in the intense heat of the burner channels 19 and 22, is effected.

*Cooling the hot gases of combustion*

From expansion fire chamber 21 above surface 18 of burner block 17 the combustion gases comprising nitrogen, carbon dioxide and water vapor will pass through a series of passageways 63 formed in a chamber 64 in the upper part of the cylinder 11 to a delivery chamber 64' at the top. A sealing lid 65 opens through a sight hole or handhole 66 into chamber 21, and a sealing lid 67 similarly opens through a sight hole or handhole 68 into chamber 64'. The tubes 63 are surrounded with air which enters chamber 64 as cold air at the top of cylinder 11 at the point 69 and which leaves as hot air toward the bottom of said chamber at 70 as very hot air. The air comes from any suitable source of supply of compressed air, not shown, through a tube 71, Fig. 14, from which it goes to a distributing chamber 72. From this distributing chamber the air for the burner goes through a pipe 73 to pipe 49 and other connections, as heretofore described, and this of course is cold air. Also, from the distributing chamber cold air goes through pipe 74 to the top of chamber 64. The air from within chamber 64, which has been heated to a high temperature by heat exchange with the intensely hot gases going through pipe 63, is carried through pipes 75 and 76 to a distributing chamber 77 for a use which will later be described and cold air from distributing chamber 72 goes through pipes 78 and 79 to a distributing chamber 80 for a use which will later be described.

By the time the gas mixture reaches chamber 64' it will have given up a large part of its heat to the air leaving the chamber 64 through pipe 75. This partially cooled gas is carried through pipe 81 to a cooler 82, Figs. 5 and 14, which is shown in detail in Figs. 11 and 12. The cooler is supplied with water from any system through pipe 83 which leaves through pipe 84 and goes to waste.

Figure 5:
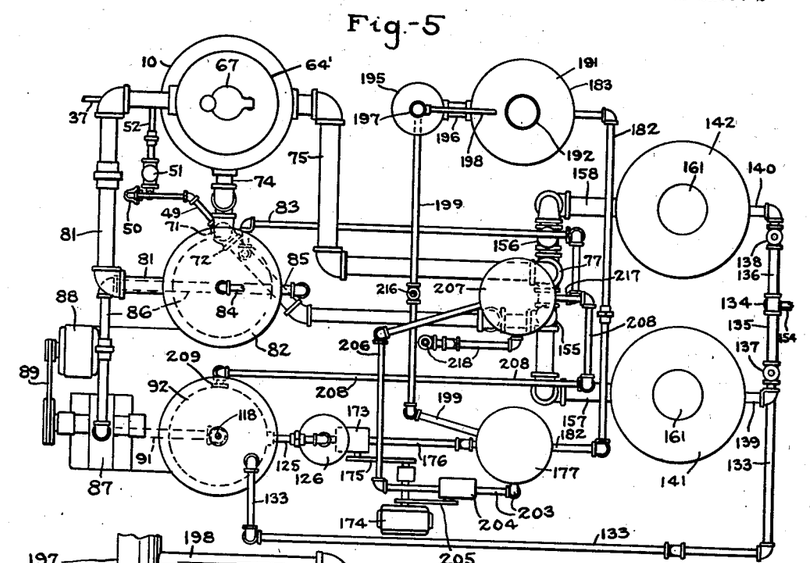
Fig. 5 is a top plan view from line 5—5 of Fig. 7.
Figure 11:
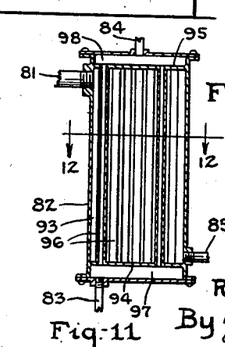
Fig. 11 is a sectional view of the cooler for cooling the gases of combustion.

The gas mixture will leave the cooler 82 at 85, Figs. 11 and 14, from which it goes through pipe 86 to a pump 87 operated by a motor 88 connected to pump 87 by belt-and-pulley connection 89, Fig. 5. From pump 87 the gas is delivered under pressure through pipe 90 to a pipe 91, Fig. 1, which puts the gas into the bottom of an absorber cylinder 92.

Figure 12:
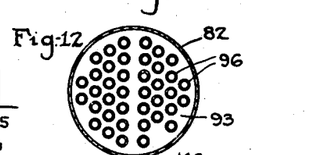
Fig. 12 is a sectional view taken on line 12—12 of Fig. 11.

The cooler 82 comprises a chamber 93 formed with heads 94 and 95 in which is seated a multiplicity of tubes 96, as clearly shown in Fig. 12. A space 97 under partition 94 receives the water from pipe 83 and distributes it through the various tubes 96 to be delivered into a space 98 above partition 95, from whence it goes through pipe 84 to waste. The gas from pipe 81 is caused to flow in chamber 93 about the tubes 96, made cold by the water flowing through them, which results in removing the additional heat from the gas so that it leaves pipe 85 at near room temperature. Since the cooling of the gas greatly diminishes its bulk, best results have been obtained by making the entrance pipe 81 considerably larger than the exhaust pipe 85.

*Removing carbon dioxide from the gas*

Figure 1:
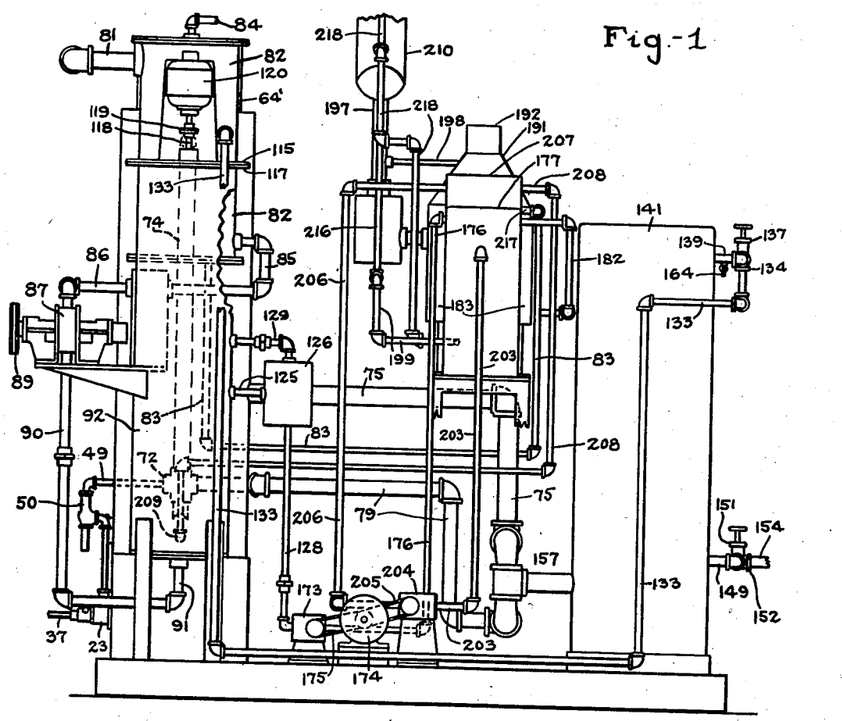
Fig. 1 is a side elevation view of the entire apparatus as assembled.

As above stated, the cooled mixture of gases pumped from the cooler 82 goes through pipe 91 under pressure, Fig. 1, into a feed tube 99, Fig. 17, which delivers into a cylindrical chamber 100. The chamber 100 is surrounded by a drum 101, the cylindrical walls 102 of which are spaced annularly from the cylindrical walls 103 surrounding chamber 100. Slightly conical partitions 104 are secured to the walls 103 and extend between them and the walls 102 on the drum 101. Apertures 105 in cylindrical wall 103 lead from chamber 100 to the spaces 106 between pairs of conical discs 104 and also into the spaces 107 and 108 at the bottom and top respectively of the drum 101. Drum 103 is secured upon a shaft 109 and is in effect an extension of that shaft, which has a rotatable bearing at 110 in a socket member 111 secured in an extension 112 on a bottom closure 113 which is fastened by means of bolts 114 to the bottom of the scrubber cylinder 92. The cylinder 92 is closed at the top by a cap 115 secured by bolts 116 to an annular flange 117 about the upper end of cylinder 92. The shaft 109 goes through a stuffing box 118 on cap 115 and is connected by joint 119 with a motor 120, Fig. 1, whereby the shaft 109, the drum 101 and a top disc 121 are rotated within cylinder 92. From all of the spaces 106 in drum 101 there extend through the cylinder wall 102 thereof a multiplicity of small holes 122 and the top disc 121 is likewise provided with a multiplicity of small holes 124.

Within the cylinder 92 is a liquid absorber of carbon dioxide, and for the purposes intended I have found the liquid compound known as monoethanolamine in a thirty per cent solution to be highly effective and satisfactory. The upper level of this liquid will be maintained at a point indicated by dotted line at 124. Below this point there is a passageway 125 in tank 92 which is extended into a small tank 126 at one side of cylinder 92 in which the liquid reaches the level indicated at 127, which is substantially the same as the level 124 in cylinder 92. A pipe 128 is adapted to withdraw the liquid from small tank 126 for reactivation thereof, as hereinafter described. A connection 129 leaves the top of small tank 126 at the point 130 and communicates with chamber in cylinder 92 through opening 131.

The above instrumentalities for freeing the furnace gases of carbon dioxide function in the following manner:

The mixture of gases from the cooler is forced under pressure of pump 87 through connecting pipe 91 and delivery tube 99 into distributor chamber 100, going from there through apertures 105 into annular passages 107 above and below and between the separator blades or discs 104, and within cylinder 102. From these spaces the gas is driven through small apertures 122, and because of the comparatively rapid rotation of the walls of drum 101 and of these apertures with it the gas moving through them is broken into an enormous number of minute bubbles. At the same time these bubbles are given a rotating movement in the whole mass of liquid within the cylinder 92, whereby their path of travel from the point where formed to their discharge at surface 124 will be a very long helix. Because of their small size and consequent relatively large surface resistance these bubbles move upwardly through the body of liquid to discharge from its surface 124 over this long helical path in a manner greatly to retard their movement through the liquid so as to hold them in the liquid a relatively long time. Further, because of the minute size of the individual bubbles of gas, such complete and long contact of all the gas comprised in the individual bubbles is effected that complete absorption of the carbon dioxide therein by the absorber liquid takes place. And this is done in an absorber tower of very moderate height.

The tiny bubbles of gas break through the surface 124 and pass through apertures 123 in rotating disc 121 and about the edges of said disc whereby any entrained liquid will be precipitated and thrown to the walls of the cylinder 92 from which the liquid will gravitate back into the main mass at 124. The gas, freed from all carbon dioxide, then goes to the space 132 at the top of tank 92, from which, still under pressure from pump 87, it is caused to pass through pipe 133 to the dehydrators later to be described. The absorber liquid, such as monoethanolamine, goes through passageway 125 into tank 126 where it is freed of its contained bubbles of gas at the surface 127 of the liquid within small tank 126, and moves from there through pipe 129 and back into tank 92. The absorber liquid is withdrawn from small tank 126 through pipe 128 and returned to the absorber cylinder 92 to effect a continuous circulation of said absorber liquid wherein, by means later to be described, the absorber liquid is continuously reactivated by having the carbon dioxide which it has absorbed expelled therefrom by boiling.

Removing water vapor from nitrogen gas

The gases freed from carbon dioxide go through pipe 133, Figs. 1 and 5, to a distributor chamber 134. As clearly shown in Fig. 5, the distributor chamber 134 has branches 135 and 136 which lead past valves 137 and 138 through short pipes 139 and 140 to one or the other of the tops of dehydrator towers 141 and 142, one of which is shown in detail in Figs. 9 and 10. By manipulating the valves 137 and 138 gas can be made to go through either of the dehydrating towers 141 or 142 as desired, and according to which of these has been reactivated for its dehydrating function.

Figure 9:
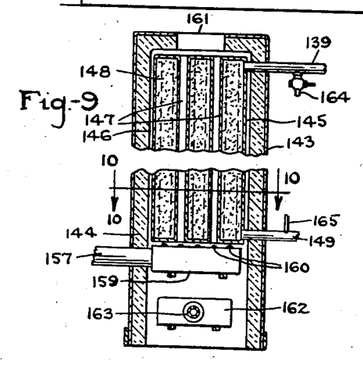
Fig. 9 is a sectional elevation view of a part of one of the dehydrators.
Figure 10:
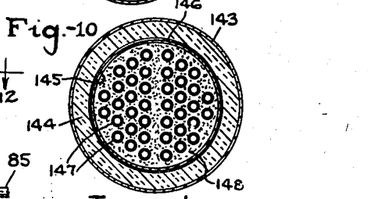
Fig. 10 is a sectional view taken on line 10—10 of Fig. 9.

As shown in Figs. 9 and 10, dehydrating tower 141 (and 142) comprises an outer shell 143, an insulating lining 144 and an inner drum 145. As clearly shown in Figs. 9 and 10, the drum 145 is spaced at 146 from the inner walls of the insulating material 145 and is provided with a multiplicity of passages 147 extending longitudinally through the drum. The drum, except for the vertical passages 147, is entirely filled with some dehydrating material 148 such as silica gel or activated alumina. I have found that activated alumina, on account of its comparatively large granular size, is an effective and desirable material for dehydrating the gas mixture.

The pipe 139 leads directly into the top of drum 145, as shown in Fig. 9, and an outlet pipe 149 leads from the bottom of drum 145.

The functioning of the above instrumentalities is that the mixture of nitrogen and water vapor leaving the absorber tank 92 through pipe 133 in passing through the dehydrator drum 145 flows slowly around and through the passages between the mass of dehydrating material 148 in said drum, and during such passage has removed therefrom substantially all water vapor carried by the gas mixture. The gas that leaves the dehydrating tower through pipe 149, is therefore, substantially pure nitrogen. It is to be noted that a similar pipe 150 extends from dehydrator tower 142, Fig. 7, and the gases go from tower 141 through pipe 149 and past valve 151 to a distributor chamber 152, while the gases go from tower 142 past valve 153 to the distributor chamber 152. From the distributor chamber 152 a pipe 154 conducts the pure nitrogen gas to any suitable means for compressing and storing the same.

Reactivating the dehydrating material

Since to obtain the nitrogen at a low cost it is essential that the above process work continuously, there must be a plurality of dehydrating towers with means for reactivating the dehydrating material in one while the other is in use for dehydrating the gas. The two towers 141, 142 have already been generally described and the means of shifting from one tower to the other through valves 147, 138 and valves 151, 153 has been described, it being understood that valves 151 and 153 are operated in the same way as valves 137 and 138. In order to reactivate the alumina 148 or other dehydrating material it is necessary to heat it to a fairly high temperature—say around 300° Fahrenheit. I effect this heating economically by taking the heated air from the combustion tower 10 at the distributor chamber 77, past one or the other of valves 155 or 156, Fig. 5, through branch pipes 157 or 158 to the bottom of dehydrating tower 141 or 142 and to a manifold 159 therein, Fig. 9. This manifold, as shown in Figs. 9 and 10, is provided with a series of nipples 160 each positioned below the mouth of one of the pipes 147, whereby heated air is driven through the passageways and also around the drum 145, this heated air discharging to atmosphere through the opening 161 in the top of the dehydrating tower. Under some conditions the air heated by heat exchange with the furnace gases in the upper part of combustion tower 10 may not be sufficiently heated to effectively reactivate the alumina 148 or other dehydrating material, and to remedy this deficiency, where it exists, I provide a gas burner 162, Fig. 9, in the lower part of each of dehydrating towers 141 and 142 supplied by gas from any suitable source, not shown, through pipe 163. The gases of combustion from this burner will further heat the air delivered from the nipples 160 by heating manifold 159 and will deliver a cylindrical sheet of heated gas about the outside of the drum 145, whereby all of the material 148 within the drum will be heated to the desired temperature and the reactivation of the material by removal of absorbed water therefrom will be effected.

When the water vapor leaves through either pipe 139 or pipe 140 it will condense in said pipes. Since these pipes will be blocked by valve 137 or 138 the water vapor will go out of the opening controlled by pet cock 164 provided in pipes 139 and 140. To aid in the removal of the generated steam or water vapor resulting from heating and consequently reactivating the dehydrating material, I provide a pipe 165, Fig. 7, having therein the valve 166 by means of which nitrogen may be forced into the bottom of the dehydrating drum 145 of either tower 141 or 142 through either pipe 149 or pipe 150, and flowing through the dehydrating material 148 will purge out the last of the entrapped steam in said material.

After the dehydrating material has been properly reactivated, and before it can be used for absorbing moisture from the nitrogen gas, it is necessary to cool the same. Further, the heat of dehydration released by the action of the alumina or other dehydrating material should be removed while a tower is being employed for the dehydrating purpose. It follows that for continuous operation there must be delivered continuously to one dehydrating tower heated air as above described, and to the other dehydrating tower cooled air. To effect this result, as best shown in Fig. 14, cold air from the pressure source delivered through pipe 71 passes through pipes 78, 79 to distributor chamber 80 from where it goes past valves 167, 168 and through pipes 169 and 170 to one or the other of pipes 157, 158, as shown in Fig. 5 and indicated in dotted lines in Fig. 14 at 171, 172. It follows that by manipulating the valves 155 and 156 for the hot air, Fig. 5, and the valves 167 and 168 for the cold air, Fig. 14, the hot air may be delivered to one of the towers, as tower 141, and at the same time cold air be delivered to the other of the towers, as tower 142, and thus the reactivation of the dehydrating material in one tower and the cooling of said material in the other tower may be carried on simultaneously.

Reactivating the carbon dioxide absorber material

There are a number of chemical liquids which have the property of absorbing carbon dioxide from a gas mixture, and which when subjected to heat will upon boiling discharge the carbon dioxide. Among these liquids are such substances as tetramine and monoethanolamine. Tetramine has greater capacity for absorption than monoethanolamine, but has corrosive characteristics which I have found make monoethanolamine a more satisfactory liquid for the purpose.

Figure 6:
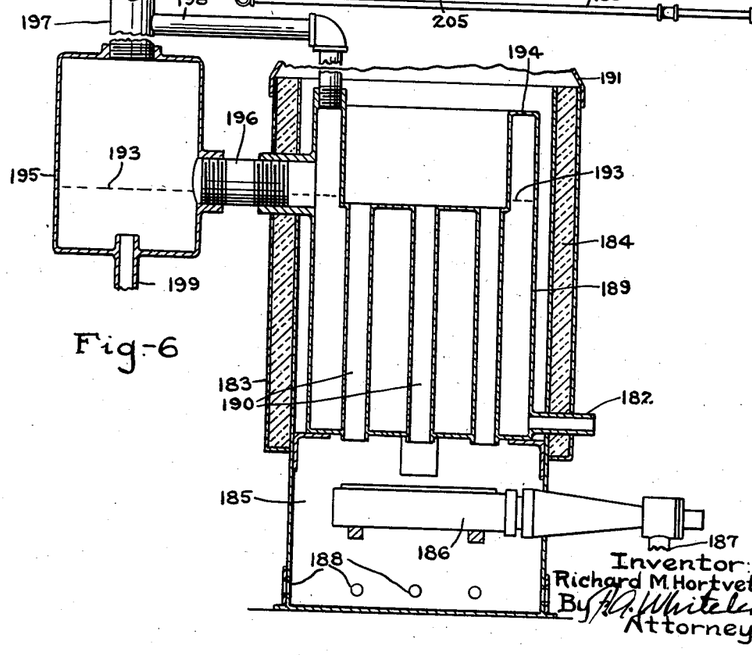
Fig. 6 is a sectional elevation view of the principal parts of the boiler for regenerating the fluid for removing carbon dioxide.
Figure 13:
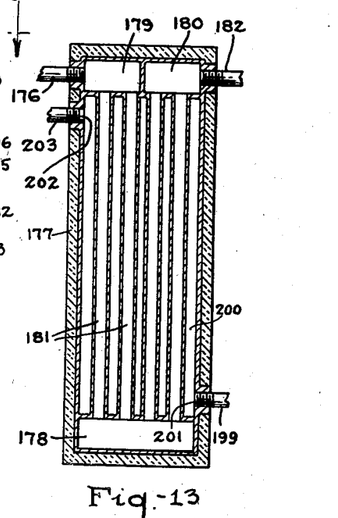
Fig. 13 is a sectional elevation view of a heat exchanger used as an aid in both heating and cooling the absorber liquid in the process of reactivating it.

The manner of using the monoethanolamine to take the carbon dioxide out of the mixed gases has been heretofore described. It is obvious, however, that in order to keep the process operating continuously it is necessary continuously to reactivate the monoethanolamine by removing therefrom the absorbed carbon dioxide, and the means for doing this will now be described:

Referring to Figs. 1 and 5, the liquid absorber material is drawn through pipe 128 and small tank 126 by means of a pump 173 operated by a motor 174 through belt-and-pulley connection 175. The pump 173 drives the liquid through a pipe 176 to the top of a heat exchanger 177, as clearly shown in Fig. 1. The details of this heat exchanger are shown in Fig. 13. The heat exchanger 177 as there shown comprises a lower chamber 178 and two upper chambers 179 and 180. The monoethanolamine enters chamber 179 from pipe 176 and passes through a multiplicity of tubes 181, all of which open into chamber 178 and half of which open into each of chambers 179 and 180. The monoethanolamine enters chamber 179 from the pipe 176, passes through part of the pipes 181 to chamber 178 and from chamber 178 through the rest of the pipes to chamber 180, from which it passes through pipe 182, Fig. 5, to a boiler 183, which is shown in detail in Fig. 6. This boiler comprises an outer insulated shell 184 with a bottom burner chamber 185 in which is a gas burner 186 supplied with gas through pipe 187 from a source of gas supply not shown. The burner chamber is supplied with air through openings 188 and the gases of combustion pass around a boiler chamber 189 within the insulated shell 184 and through numerous tubular passages 190 extending through the boiler member 189 and from the top thereof into a conical member 191 which discharges to atmosphere at 192. The liquid monoethanolamine, preheated in the heat exchanger 177, passes from pipe 182 into boiler chamber 189, where it reaches a normal level, indicated by the dotted line 193 which extends across the bottom of an annular steaming chamber 194 in the top of the boiler chamber and into a small expansion tank 195 communicating with the boiler by means of a passageway 196, all as shown in Fig. 6.

The water level line 193 is at atmospheric pressure and the released carbon dioxide gas with some monoethanolamine vapor passes directly from the top of small tank 195 to pipe 197. Likewise, the carbon dioxide and vapor released in the top of the chamber 194 passes through pipe 198 to pipe 197.

Figure 7:
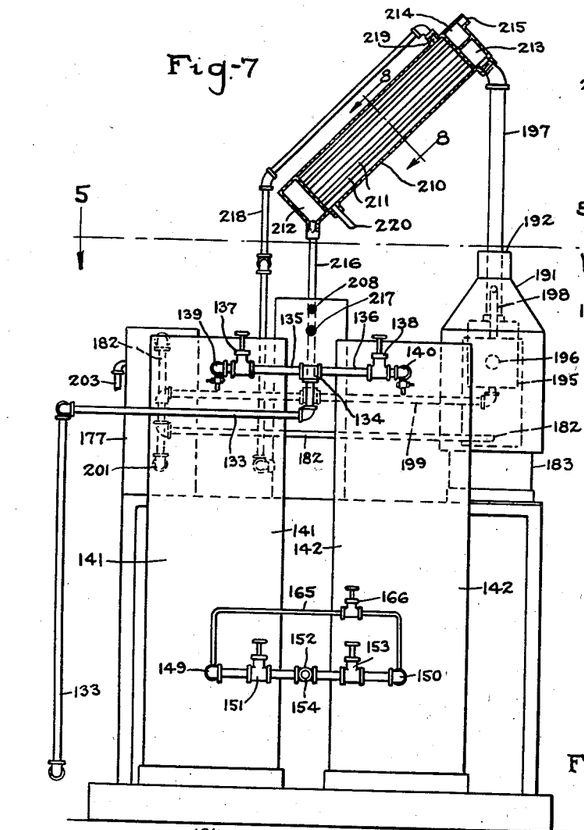
Fig. 7 is an end elevation view of the entire apparatus viewed from the nitrogen removing end of the same with the condenser for carbon dioxide absorber shown in section.

The liquid monoethanolamine moves into small tank 195 through passageway 196 and discharges from the bottom of tank 195 through a pipe 199, clearly indicated in Fig. 5 and indicated in dotted lines in Fig. 7. The pipe 199, as shown in Figs. 5 and 13, enters the heat exchanger chamber 200 at a point near its bottom, as indicated at 201. The hot liquid from the boiler fills the chamber 200 to a point 202 near the top thereof, Fig. 13, from which it flows by gravity through pipe 203 to a second pump 204, Fig. 5, which is operated by the second belt-and-pulley drive 205 from motor 174. The very hot liquid loses a considerable part of its heat in heat exchanger 177 and is passed from pump 204 through piping 206 to a cooler 207, which is similar in its internal construction to heat exchanger 177 heretofore described, and shown in detail in Fig. 13. From the cooler 207, as clearly shown in Fig. 5, the cool monoethanolamine goes through piping 208 to a point 209 at the side and near the bottom of the scrubber or absorber tank 92 and into it at that point.

Figure 8:
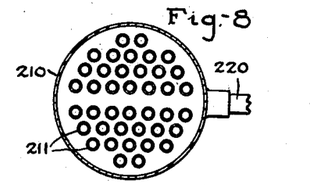
Fig. 8 is a sectional view taken on line 8—8 of Fig. 7.

Since there will be a considerable amount of vapor of monoethanolamine driven off at surface 193 in the boiler and supplemental tank 195, it is necessary to employ a condenser to recover such monoethanolamine vapor. This condenser is shown in Figs. 1, 7 and 8, and comprises a cylinder 210, which is perfectly mounted at an angle, as shown. This cylinder comprises a multiplicity of tubes 211, all of which open into a chamber 212 at the lower end of cylinder 210 and part of which open into a chamber 213 and part in a chamber 214 at the top of cylinder 210. The pipe 197 carrying the $CO_2$ and vapor from the boiler 191 discharges these gases into chamber 213, from which they pass through a portion of pipes 211 into chamber 212 and back through the remainder of pipes 211 into chamber 214. From chamber 214 the carbon dioxide gas exhausts to atmosphere through port 215. The monoethanolamine condensed in the passageways 211 gravitates through pipe 216 and joins with pipe 199 through which it moves with the rest of the monoethanolamine to the lower portion of heat exchanger 177.

The water circulation which has heretofore been described as going through the cooler 82 also goes through cooler 207 and condenser 195. Water pipe 83 leads into cooler 207, as indicated at 217, Figs. 5 and 7. From cooler 207 pipe 218 leads to the point 219 where it enters condenser 210, Fig. 7. From condenser 210 pipe 220 leads to the water system from which water is supplied under pressure.

From the above it will be seen that the water flows first through condenser 210, then through cooler 207 and finally through cooler 82, from which it discharges to the sewer through pipe 84.

The advantages of my invention will be apparent from the foregoing description. The primary and highly important utility is the recovery of nitrogen of a high degree of purity in large quantities and at very small expense. The quantity of nitrogen recovered from any plant embodying the steps of my process and apparatus for carrying it out can be determined by the size of the plant. I have found, however, that it is practical to provide different sizes of plants practical and effective in operation for the production of nitrogen at rates from 100 cu. ft. per hour to 3,000 cu. ft. per hour.

It will be apparent that in order to accomplish these results and obtain the economies desired, and which are essential for the production of nitrogen for the more general commercial uses, the continuous uninterrupted operation of the plant and all of its component parts is required. This continuous operation can only take place when there is continuous reactivation of the carbon dioxide absorber liquid and of the dehydrating material. It is a feature of great advantage in my process that the reactivation of these materials is effected largely by heat saved through heat exchange with both the burning of gas and air to obtain the oxygen-free mixture of gases, and with the heated absorber liquid after boiling off the absorbed carbon dioxide.

My process in all of its features is designed and operates to produce large volumes of substantially pure nitrogen from the air at not only a relatively low cost of production but also at a relatively low cost of the apparatus making up the plant.

I claim:

1. A process of obtaining nitrogen from air which consists in causing a stream of fuel gas and a surrounding stream of air to unite at an ignition point, effecting ignition of the gas within the surrounding envelope of air at that point, thereafter controlling expansion and forward movement of the gases of combustion by means of walls of a refractory block so the same will continually expand diametrically for a predetermined distance through said block, at the end of said distance causing the direction of movement of the ignited gas to be changed sharply by impingement against walls of said refractory block, whereby the whole body of said refractory block and particularly the said constraining walls thereof become heated to a very high temperature to cause complete union of all the molecules of the fuel gas and of the oxygen of the air introduced at said ignition point, the combustion gas mixture and the nitrogen therein being maintained in continuous motion from the point of burning to the place where the finally separated nitrogen is accumulated, cooling the resulting gas mixture, thereafter causing the cooled gas mixture to move in an elongated helical path in fine bubbles in a solution for absorbing carbon dioxide to remove the carbon dioxide therefrom, then removing water vapor therefrom, leaving substantially pure nitrogen, and accumulating said nitrogen for use.

2. A process of obtaining nitrogen from air which consists in causing a stream of fuel gas and a surrounding stream of air to unite at an ignition point, regulating the relative volumes and delivery rates of the fuel gas and air so that the number of molecules of oxygen in the air relative to the number of molecules of the fuel gas will permit complete union thereof without residuum of either upon combustion, effecting ignition of the gas within the surrounding envelope of air at that point, thereafter controlling expansion and forward movement of the gases of combustion by means of walls of a refractory block so the same will continually expand diametrically for a predetermined distance through said block, at the end of said distance causing the direction of movement of the ignited gas to be changed sharply by impingement against walls of said refractory block, whereby the whole body of said refractory block and particularly the said constraining walls thereof become heated to a very high temperature to cause complete union of all the molecules of the fuel gas and of the oxygen of the air introduced at said ignition point, thereafter removing carbon dioxide from the resulting gas mixture and then removing water vapor therefrom, leaving substantially pure nitrogen, and accumulating said pure nitrogen for use, the combustion gas mixture and the nitrogen therein being maintained in continuous motion from the point of burning to the place where the finally separated nitrogen is accumulated.

RICHARD M. HORTVET.